(12) United States Patent
Chen et al.

(10) Patent No.: US 9,407,739 B2
(45) Date of Patent: Aug. 2, 2016

(54) MOBILE TERMINAL

(75) Inventors: Yajun Chen, Shenzhen (CN); Shougang Cheng, Shenzhen (CN); Jun Shen, Shenzhen (CN); Yu Qin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/396,602

(22) PCT Filed: Jun. 20, 2012

(86) PCT No.: PCT/CN2012/077258
§ 371 (c)(1),
(2), (4) Date: Oct. 23, 2014

(87) PCT Pub. No.: WO2013/159444
PCT Pub. Date: Oct. 31, 2013

(65) Prior Publication Data
US 2015/0080066 A1    Mar. 19, 2015

(30) Foreign Application Priority Data

Apr. 23, 2012 (CN) ................ 2012 2 0176420 U

(51) Int. Cl.
| | | |
|---|---|---|
| *H01Q 9/42* | (2006.01) | |
| *H01Q 5/378* | (2015.01) | |
| *H04M 1/02* | (2006.01) | |
| *H01Q 1/24* | (2006.01) | |
| *H01Q 19/00* | (2006.01) | |
| *H01Q 5/371* | (2015.01) | |

(52) U.S. Cl.
CPC ............. *H04M 1/026* (2013.01); *H01Q 1/243* (2013.01); *H01Q 5/371* (2015.01); *H01Q 5/378* (2015.01); *H01Q 9/42* (2013.01); *H01Q 19/00* (2013.01); *H01Q 1/245* (2013.01)

(58) Field of Classification Search
CPC ......... H04M 1/026; H01Q 1/243; H01Q 9/42; H01Q 5/378; H04B 7/0469
See application file for complete search history.

(56) References Cited

U.S. PATENT DOCUMENTS

| | | | | |
|---|---|---|---|---|
| 5,952,971 | A * | 9/1999 | Strickland | H01Q 1/38 343/700 MS |
| 2001/0046849 | A1* | 11/2001 | Villemazet | H03D 7/1441 455/326 |
| 2010/0171679 | A1* | 7/2010 | Ohshima | H01Q 9/0407 343/893 |
| 2010/0309064 | A1* | 12/2010 | Sung | H01Q 9/42 343/702 |
| 2012/0218184 | A1* | 8/2012 | Wissmar | G06F 3/0346 345/158 |
| 2013/0106667 | A1* | 5/2013 | Fenn | H01Q 1/525 343/793 |
| 2013/0113668 | A1* | 5/2013 | Kyriazidou | H01Q 19/06 343/753 |
| 2014/0161464 | A1* | 6/2014 | Bowers | H04B 10/2575 398/115 |

FOREIGN PATENT DOCUMENTS

| | | | | |
|---|---|---|---|---|
| CN | 101515665 | * | 8/2009 | ............ H01Q 1/22 |
| JP | 2006-237813 | * | 7/2006 | ............ H01Q 13/08 |

* cited by examiner

*Primary Examiner* — Andrew Wendell
(74) *Attorney, Agent, or Firm* — Jenkins, Wilson, Taylor & Hunt, P.A.

(57) ABSTRACT

Disclosed is a mobile terminal. The mobile terminal comprises an antenna body and a metal ring. The metal ring is provided on the mobile terminal without contacting the antenna body, and the vertical projection of the metal ring on a plane where the antenna body is located intersects the antenna body. By means of the disclosure, signal receiving performance of the mobile terminal is improved, and the loss caused by head and hand is reduced to a certain extent.

12 Claims, 4 Drawing Sheets

MOBILE TERMINAL

TECHNICAL FIELD

The disclosure relates to the field of communications, and in particular to a mobile terminal.

BACKGROUND

The radio frequency space over-the-air (OTA) measurement comprises a total radiated power (TRP) and a total isotropic sensitivity (TIS). At present, every major network operators not only have clear index requirements for the OTA performance of a terminal antenna in a free space, but also have requirements for user experience during actual use. For example, how to avoid the degrading of the antenna performance within the head and hand phantoms has become an unavoidable problem for terminal antenna designs. In the related art, an antenna is provided at the top of a mobile phone. However, the condition of the top of a mobile terminal is complex, especially for an intelligent mobile terminal. For example, the top comprises dual cameras, a proximity sensor and a receiver, etc., with more factors influencing the antenna. Therefore, the mobile terminal of the solution still has a relatively high loss caused by the head and hand.

At present, there is no effective solution for the problem that the antenna solutions of mobile terminals result in relatively high loss caused by the head and hand in the related art.

SUMMARY

The disclosure provides a mobile terminal so as to at least solve the problem that the antenna solutions of mobile terminals result in relatively high losses caused by the head and hand in the related art.

According to one aspect of the disclosure, a mobile terminal is provided, which comprises: an antenna body, and a metal ring which is provided on the mobile terminal and is not in contact to the antenna body, and the vertical projection of the metal ring on a plane where the antenna body is located intersects the antenna body.

Preferably, the metal ring is provided on the main board of the mobile terminal.

Preferably, the metal ring is provided on a first support on the rear housing of the mobile terminal.

Preferably, the mobile terminal further comprises a feeding circuit which is provided on the main board of the mobile terminal and is connected to the antenna body.

Preferably, the antenna body is provided on the bottom of the rear housing of the mobile terminal or a second support of the bottom via the flexible printed circuit board (FPC) process.

Preferably, the circumference of the metal ring is one quarter of the wavelength of the signal received by the mobile terminal.

Preferably, the antenna body is a monopole antenna or an inverse flat antenna (IFA).

In the disclosure, a mobile terminal comprises an antenna body and a metal ring which is provided on the mobile terminal and is not in contact to the antenna body, wherein the vertical projection of the metal ring on a plane where the antenna body is located intersects the antenna body, so as to solve the problem that the antenna structure of mobile terminals results in relatively high loss caused by hand and head in the related art, thereby achieving the effects of improving the mobile terminal receiving performance while reducing the mobile terminal loss caused by hand and head.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
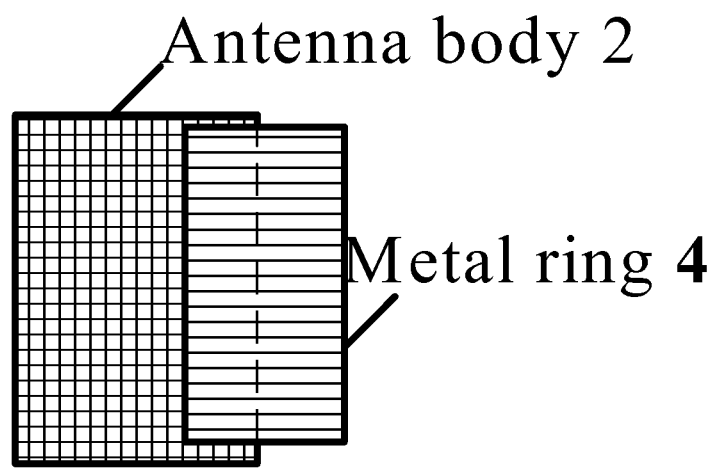
FIG. 1 is a structural block diagram of a mobile terminal according to an embodiment of the disclosure.

The disclosure provides a mobile terminal, and FIG. 1 is a structural block diagram of a mobile terminal according to an embodiment of the disclosure. As shown in FIG. 1, the mobile terminal comprises an antenna body 2 and a metal ring 4. The above-mentioned structure is described below in detail:

the antenna body 2; and the metal ring which is provided on the mobile terminal and is not in contact with the antenna body, wherein the vertical projection of the metal ring on a plane where the antenna body is located intersects the antenna body.

By means of the above-mentioned structure, the high frequency radiation defensive line and the beam direction of the antenna body may be changed via the loop structure of the metal ring, thereby improving the mobile terminal receiving performance while reducing the loss of the mobile terminal caused by the head and hand.

During the implementation, in order to improve the installation convenience of the metal ring, the following two methods may be used:

the first method: the metal ring is provided on the main board of the mobile terminal; and the second method: the metal ring is provided on the first support on the rear housing of the mobile terminal.

With regard to the first method, the metal ring is photo etched on a main board (a Printed Circuit Board (PCB) substrate) using the micro-strip fabrication process, which brings few changes to the structure of the prior art; whereas method two is easier to operate.

In order to enhance the signal receiving performance of the mobile terminal, the mobile terminal further comprises a feeding circuit which is provided on the main board of the mobile terminal and is connected to the antenna body.

During the implementation, the antenna body may be provided on the bottom of the rear housing of the mobile terminal or a second support at the bottom via the flexible printed circuit board (FPC) process. The preferred embodiment improves the setting flexibility of the antenna body.

In order to improve the performance of the metal ring changing the high frequency radiation defensive line and the beam direction of the antenna body, the circumference of the metal ring is one quarter of the wavelength of the signal received by the mobile terminal.

Preferably, the antenna body is a monopole antenna or an inverse flat antenna (IFA). The preferred embodiment improves the availability of the disclosure.

The description will be given below in combination with the preferred embodiments, and the following preferred embodiments combine the above-mentioned embodiments and preferred embodiments.

First Preferred Embodiment

Figure 4:
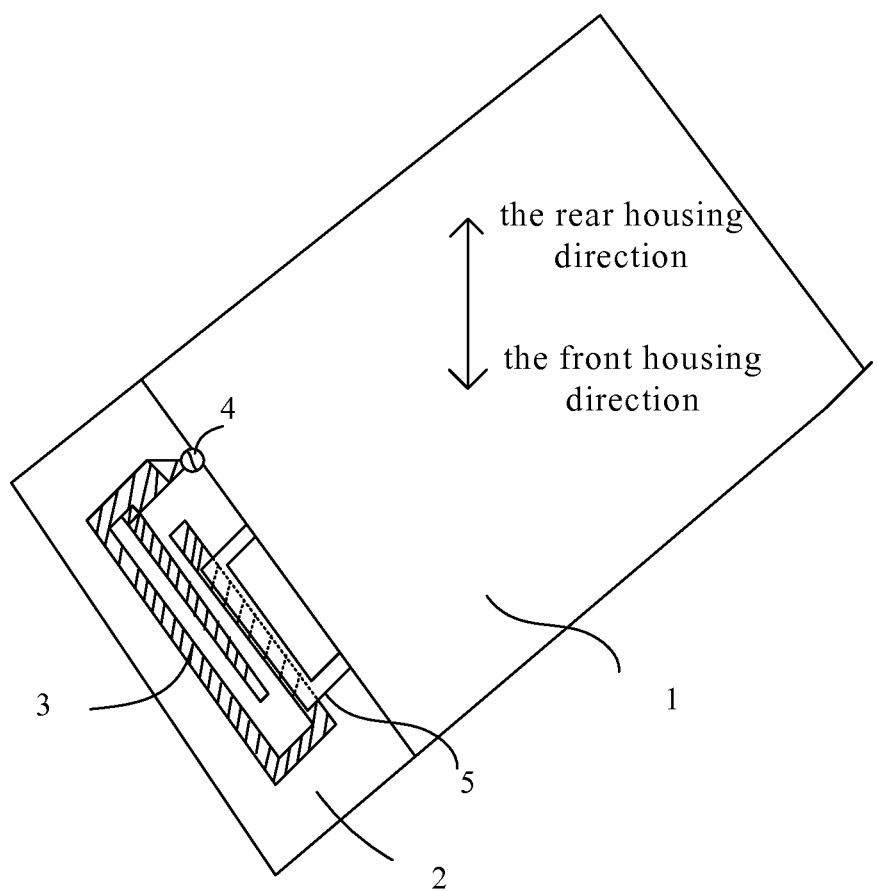
FIG. 4 is a schematic diagram of a mobile terminal of which the main antenna is a monopole antenna and which has a leading ring according to an embodiment of the disclosure.

The present embodiment provides a mobile terminal. FIG. 4 is a schematic diagram of a mobile terminal of which the main antenna is a monopole antenna and which has a leading ring according to an embodiment of the disclosure. As shown in FIG. 4, the mobile terminal comprises a main antenna 3, a feed component 4, a PCB substrate 2, a baseboard 1 and a leading ring 5 (equivalent to the metal ring 4 of the above-mentioned embodiment), wherein the main antenna 3 may be pasted to the bottom or the support of the rear housing via FPC or other processes and is connected to the feed component 4 on the PCB substrate; the main antenna 3 is a monopole antenna or an IFA antenna, etc.; the leading ring 5 is photo etched on a sub-board or a main board via the micro-strip fabrication process, and is located in the projection area of the main antenna 3; and the leading ring 5 is a one-quarter loop structure leaded from the baseboard.

According to the preferred embodiment, the beam direction of the high frequency radiation pattern of the main antenna is effectively changed via the leading ring itself and the loop structure formed by the leading ring and the baseboard, thus enabling to better face towards the terminal front housing in the high frequency direction, so that the sensitivity of the head and hand to a near field is weakened, the whole engine performance OTA index is improved, and at the same time, the risk of body SAR is reduced.

Second Preferred Embodiment

The present preferred embodiment provides a mobile terminal which may be used for reducing the loss caused by the head and hand and SAR. The mobile terminal of the present preferred embodiment adopts the structure of the mobile terminal in the first preferred embodiment.

In the present preferred embodiment, the main antenna 3 may be pasted to the bottom or the support of the rear housing via FPC or other processes and is connected to the feed component 4 on the PCB substrate 2. The main antenna 3 may be a monopole or an IFA, and is a monopole antenna in the present preferred embodiment.

Preferably, in the present embodiment, the leading ring 5 is photo etched on a PCB substrate via the micro-strip fabrication process, and is located in the projection area of the main antenna; and as an extension part of the baseboard 1, the leading ring forms a closed ring with the baseboard 1; the length and size of each support arm approximately corresponds to one-quarter wavelength of the frequency band to be improved; and at the same time, the ring structure is located in the projection area of the main antenna 3. The following is the comparison of high frequency beams by comparing the conditions of a leading ring being added and not added in the mobile terminal.

Figure 2:
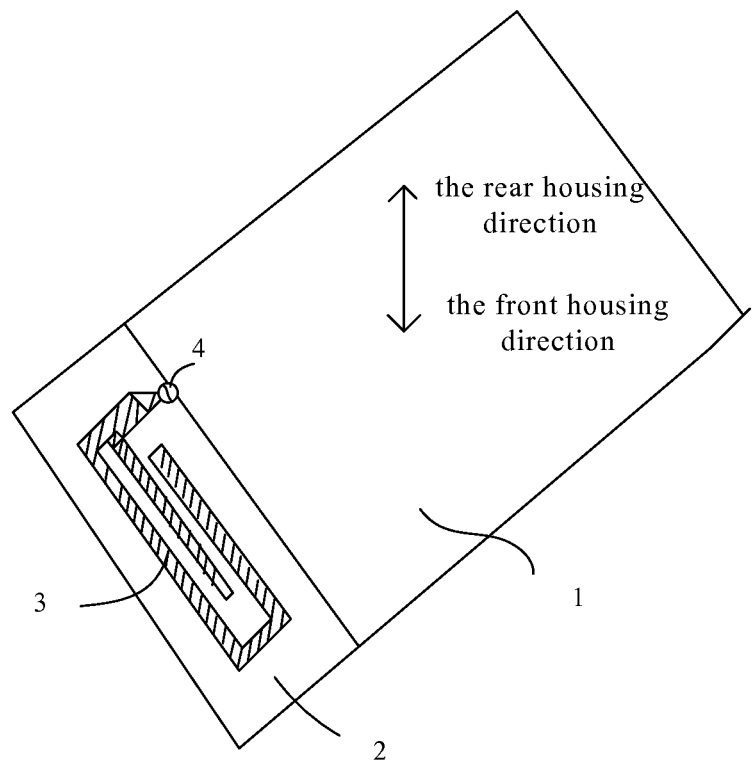
FIG. 2 is a schematic diagram of an antenna of a mobile terminal according to an embodiment of the disclosure.

FIG. 2 is a schematic diagram of an antenna of a mobile terminal according to an embodiment of the disclosure. As shown in FIG. 2, there is no leading ring added in the figure, and the mobile terminal comprises a baseboard 21, a PCB substrate 22, a main antenna 23 and a feed component 24. The beam direction of the antenna shown in FIG. 2 is as shown in FIG. 3.

Figure 5:
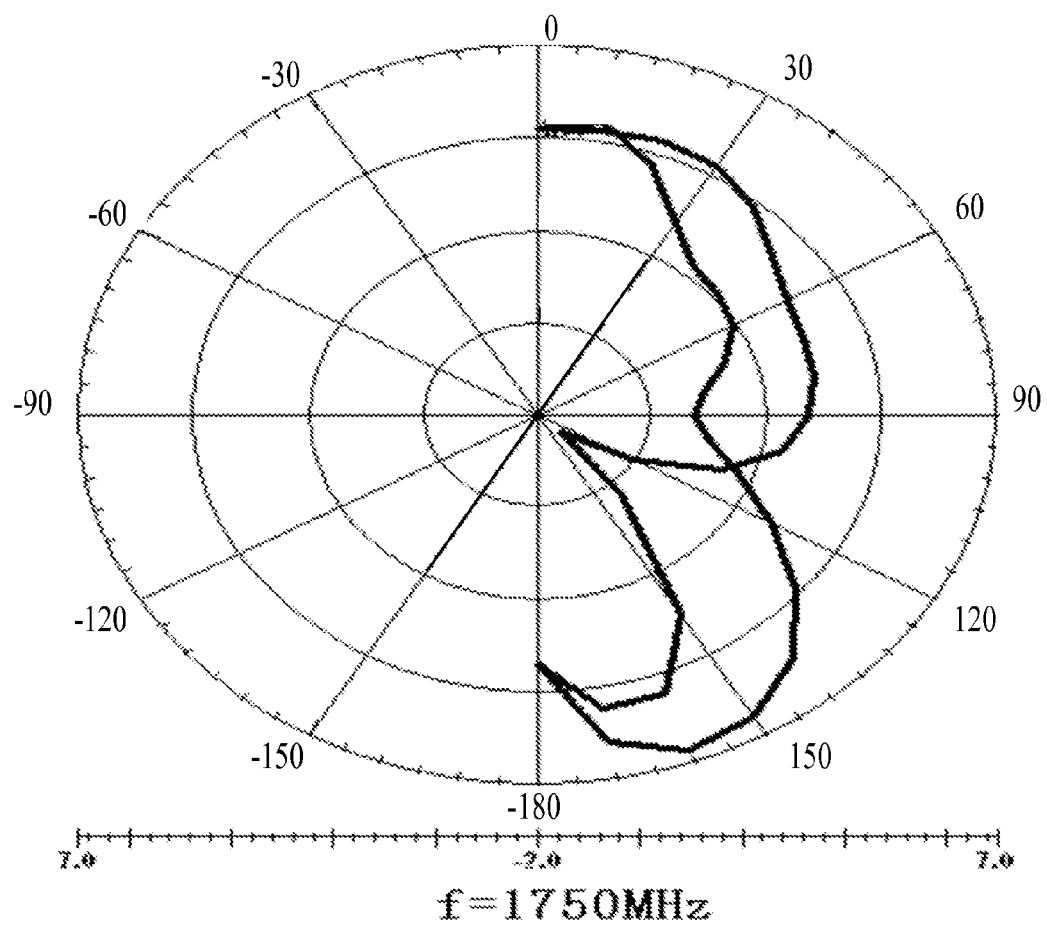
FIG. 5 is a schematic diagram of signal direction of a first antenna which works at high frequency 1750 MHz and has a leading ring according to an embodiment of the disclosure.

The structure of a mobile terminal which adds a leading ring is as shown in FIG. 4, and the beam direction of the antenna shown in FIG. 4 is as shown in FIG. 5.

Figure 3:
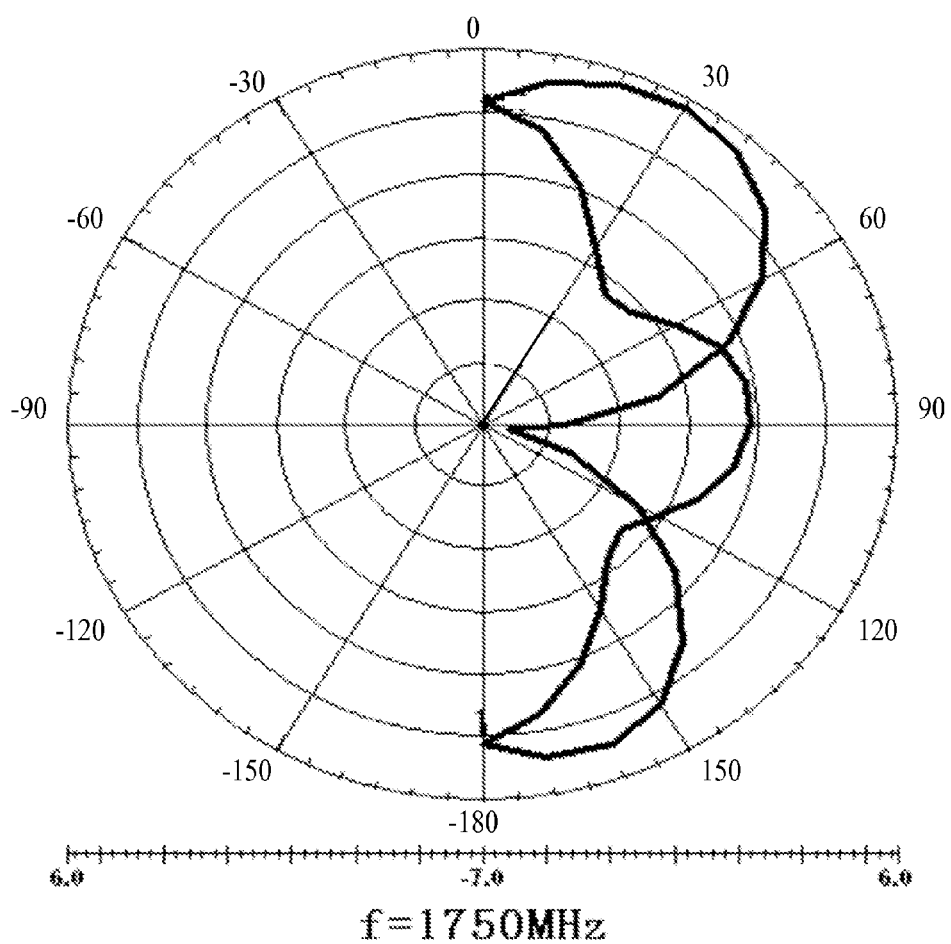
FIG. 3 is a schematic diagram of signal direction of a first antenna which has not a leading ring and works at high frequency 1750 MHz according to an embodiment of the disclosure.

Comparing FIG. 3 and FIG. 5, it can be seen that the beam direction of the high frequency radiation pattern of the main antenna is effectively changed via the leading ring 5 itself and the loop structure formed by the leading ring and the baseboard 1, thus enabling to better face towards the terminal front housing in the high frequency direction; when facing towards the direction of the front housing, i.e., Theta, between 90-180 degrees, due to the introduce of the leading ring, the beam direction facing towards the front housing direction is increased by 0.5-1.5 dB on average, the sensitivity of the head and hand to a near field is weakened, the whole engine performance OTA index is improved, and at the same time, the risk of body SAR is reduced.

According to the above-mentioned embodiment, a mobile terminal is provided; the beam direction of the high frequency radiation pattern of the main antenna is effectively changed via the leading ring itself and the loop structure formed by the leading ring and the baseboard, thus enabling to better face towards the terminal front housing in the high frequency direction, so that the sensitivity of the head and hand to a near field is weakened, the whole engine performance OTA index is improved, and at the same time, the risk of body SAR is reduced. It should be noted that these technical effects may not be provided by all of the above-mentioned embodiments, and some technical effects may only be obtained by some preferred embodiments.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A mobile terminal, comprising:
   an antenna body; and
   a metal ring located on the mobile terminal, wherein the metal ring is not in contact with the antenna body and a vertical projection of the metal ring on a plane where the antenna body is located intersects the antenna body;

wherein a circumference of the metal ring is one quarter of a wavelength of signals the mobile terminal is configured to receive.

2. The mobile terminal according to claim 1, wherein the metal ring is located on a main board of the mobile terminal.

3. The mobile terminal according to claim 1, wherein the metal ring is located on a first support on a rear housing of the mobile terminal.

4. The mobile terminal according to claim 1, wherein the mobile terminal further comprises:
   a feeding circuit on a main board of the mobile terminal and connected to the antenna body.

5. The mobile terminal according to claim 1, wherein the antenna body is located on a bottom of a rear housing of the mobile terminal or a second support at a bottom via a flexible printed circuit board (FPC) process.

6. The mobile terminal according to claim 1, wherein the antenna body comprises a monopole antenna or an inverse flat antenna (IFA).

7. The mobile terminal according to claim 2, wherein the mobile terminal further comprises:
   a feeding circuit on the main board of the mobile terminal and connected to the antenna body.

8. The mobile terminal according to claim 3, wherein the mobile terminal further comprises:
   a feeding circuit on a main board of the mobile terminal and connected to the antenna body.

9. The mobile terminal according to claim 2, wherein the antenna body is located on a bottom of a rear housing of the mobile terminal or a second support at a bottom via a flexible printed circuit board (FPC) process.

10. The mobile terminal according to claim 3, wherein the antenna body is located on a bottom of the rear housing of the mobile terminal or a second support at a bottom via a flexible printed circuit board (FPC) process.

11. The mobile terminal according to claim 2, wherein the antenna body comprises a monopole antenna or an inverse flat antenna (IFA).

12. The mobile terminal according to claim 3, wherein the antenna body comprises a monopole antenna or an inverse flat antenna (IFA).

* * * * *